United States Patent Office 3,440,797
Patented Apr. 29, 1969

3,440,797
APPARATUS FOR FILLING AND SEALING CONTAINERS
Erich R. Spielmann, Loughton, England, assignor to The British Oxygen Company Limited, a British company
Filed May 2, 1966, Ser. No. 547,007
Claims priority, application Great Britain, May 6, 1965, 19,181/65
Int. Cl. B21d 51/26; B65b 7/16
U.S. Cl. 53—83                3 Claims

ABSTRACT OF THE DISCLOSURE

The filling of metal bulbs with liquefied carbon dioxide is speeded-up by apparatus in which a closure lid for each bulb is blanked-out from a metal strip and resistance-welded to the lip of the bulb, the punch functioning also as a welding electrode.

---

Figure 1:
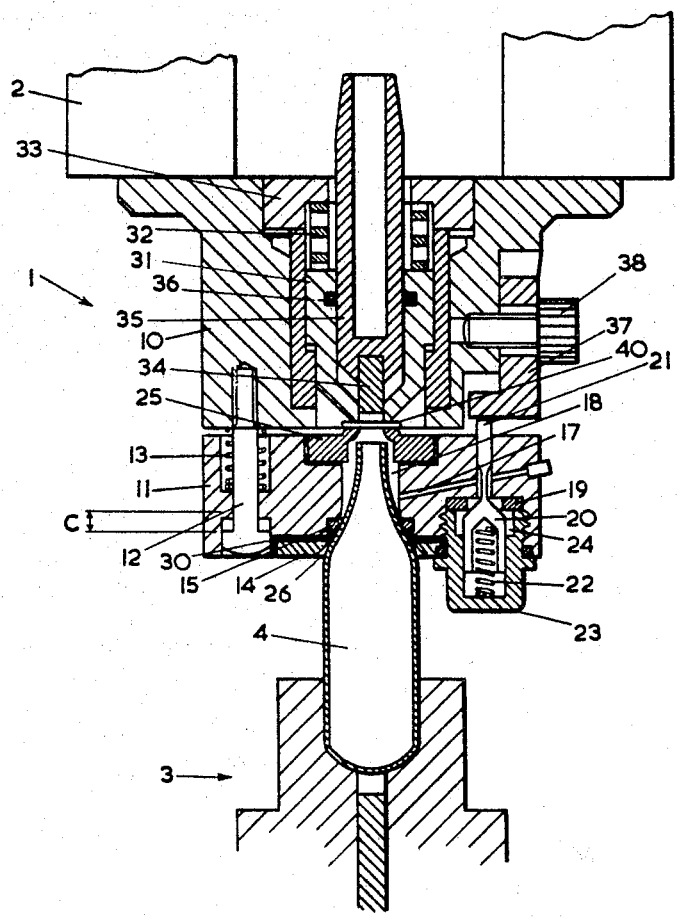

This invention relates to filling and sealing containers with fluid, and more particularly to a process and apparatus for the pressurized fluid or gas charging and subsequent sealing of small metal bulbs such as those sold under the registered trade mark "Sparklets."

In one known method of sealing such containers, pre-shaped closure elements are fitted onto the empty containers in a manner which permits fluid to enter the container, and the containers are then passed to a filling station where they are charged with pressurized fluid and where the closure element is electrically resistance welded onto the container to seal it. This method has two disadvantages: pre-assembly of the closure elements onto the containers is required, and the gas turbulence caused by gas inflow into a container tends to dislodge the closure element. The latter disadvantage may be mitigated either by limiting the fluid inflow rate or by using special inter-fitting closure elements and containers; however the first of these measures slows output rate while the second increases the manufacturing cost of the closure elements and/or the containers.

The present invention overcomes both these disadvantages by providing a process in which there is no pre-assembly of the closure elements onto the containers, and in which the rate of gas flow into a container is not restricted by the presence of a closure element.

According to the present invention, a process for filling a container with fluid and then sealing it comprises the steps of forming a chamber one wall of which is defined by the container to be filled, another wall of which is defined by the bore of a hollow die, and another wall of which is defined by a portion of strip stock held over the opening in the hollow die, charging fluid into the chamber to fill the container and subsequently punching a closure element from the strip stock by means of a punch co-operating with the die, and sealing the closure element onto the container.

The closure element may be sealed onto the container either by pure deformation or by welding. Resistance welding, cold welding, ultrasonic or induction welding may be used, for example, and in the case of resistance and ultrasonic welding one welding electrode may serve as a punch to blank out the closure elements from the strip prior to welding.

Punching of the closure elements from the strip may be facilitated if the cap is preformed or partly severed by a separate operation prior to punching, and consequently the term "punched" is intended to mean the final separation of the element from the strip.

Apparatus for carrying out the process of the present invention may comprise container engaging means adapted to engage in fluid-tight manner the container to be filled and sealed, a hollow die co-axial with the container and spaced from the container mouth when the container is engaged by the container engaging means, a hollow releasable clamping and sealing bush adapted to hold the strip stock in fluid tight manner against the end of the hollow die remote from the container, passage means for the flow of fluid into a closed chamber around the container mouth and into the container, the closed chamber being defined at least by the hollow die, the strip stock, and the container, valve means allowing the admission of fluid to the closed chamber through the passage means, a punch operable within the hollow clamping and sealing bush and adapted to punch a closure element from the strip stock subsequent to filling of the container, and means for sealing the closure element onto the container.

The means for sealing the closure element onto the container preferably includes the punch and may also include means for feeding welding current to the punch and to the container.

The invention also comprises a container filled with fluid under pressure and having its mouth closed by a closure element which was punched from strip stock and sealed to the container after the container had been filled with fluid.

Figure 2:
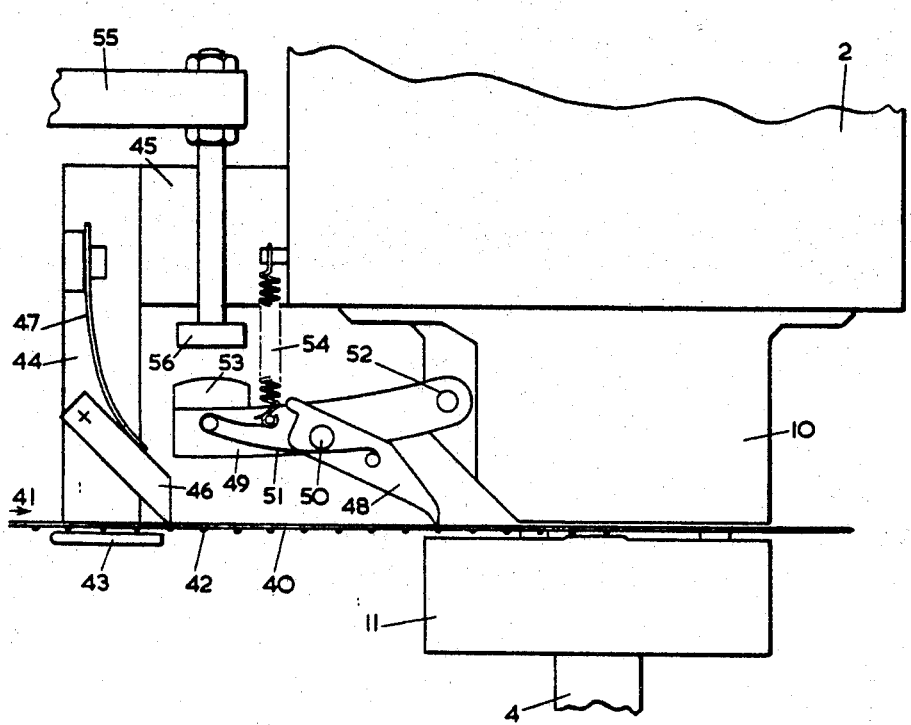

According to one example the invention is applied to the filling and sealing of small metal bulbs such as are used to supply carbon dioxide gas for rechargeable soda water syphons. An apparatus for filling and sealing such bulbs will now be described by way of example with reference to the accompanying diagrammatic drawings in which:

FIGURE 1 is a cross-sectional front elevation of a filling station assembly which forms an essential part of the apparatus, and FIGURE 2 shows a side elevation of this assembly and of strip feeding means.

Referring to the drawings, and particularly to FIGURE 1, the filling station assembly 1 is shown attached to a vertically reciprocal holder 2, which is conveniently a pneumatically operated ram of a spot welding machine. The filling station assembly is disposed above an indexing table, of which a portion is indicated at 3, by means of which metal bulks 4 may be individually and successively positioned under the filling station assembly while this is in its raised position. The assembly is arranged to be lowered into engagement with each of the bulbs in turn.

The filling station assembly 1 comprises an upper body part 10 fixed to the holder 2 and a lower body part 11 which is attached to the part 10 by three studs 12 (only one of which is shown). The studs 12 allow a limited axial movement between the parts 10 and 11 which is determined by the clearance C. Springs 13 urge apart the parts 10 and 11. Axial alignment of the parts 10 and 11 is ensured by two guidepins (not shown) extending from the upper part 10 into holes in the lower part 11.

The lower body part 11 has an axial bore and a resilient sealing ring 15 is provided at the lower end of the bore to ensure fluid-tight engagement with the neck of the bulb 4.

Below the lower body part 11 is mounted an annular electrode 14 having a divergent axial bore 26 for contacting the neck of the bulb 4. Electrically insulating material 30 is disposed between this electrode 14 and the lower body part 11. An inlet passage 17 opens into a chamber 18, referred to in more detail below, around the neck of the bulb 4, and this passage communicates with a valve comprising a valve seat 19 and a valve member 20 which has a projecting operating stem 21 and which is urged into the closed position by spring 22 retained by a removable cap 23. The annular space 24 on the inlet side of the valve is connected to a supply of pressurized fluid.

A hollow die 25 is mounted within the lower body part 11 and its inner wall co-axially surrounds and is spaced from the neck of the bulb 4. The opening in the top face of the die is sized to correspond approximately to the diameter of the neck opening of the bulb 4 so that a closure element blanked through the die can close the mouth of the bulb.

The upper body part 10 is provided with an axial recess in which a clamping bush 31 is slidable. The bush 31 is urged downwardly by a clamping spring 32. A combined punch and resistance welding electrode 34 is carried at the tip of an electrode holder 35 which is slidable within the bush 31. The electrode holder 35 is movable independently of the upper body part by an actuator (not shown). The combined punch and electrode 34 is made of material which, while being a good electrical conductor, is sufficiently hard to co-operate with the die 25 for punching a closure disc from a metal strip 40 clamped between the bush 31 and the die 25. Further details of the metal strip 40 and its feeding mechanism will be given below.

The upper body part 10 is further provided with a valve actuator 37, adapted to contact the projecting portion of the operating stem 21 and to open the valve when the body parts 10 and 11 are moved close together. The position of the acutator 37 may be adjusted on slackening of the retaining screw 38, so that the valve is not opened until the closure of the two body parts has been sufficient to close the clamping bush 31 and the die 25 firmly onto the strip 40.

Particular reference will not be made to FIGURE 2 which shows a side elevation of the filling station assembly and the means associated therewith for feeding the strip 40 thereto.

The metal strip 40 is of a suitable gauge for forming closure discs for the bulbs and is supplied in a width slightly larger than the diameter of the discs required. The strip is shown formed with a series of dimples 42 spaced regularly along its length. These were formed by passing the flat strip between rollers (not shown) having co-acting projections and depressions. These dimples are intended to form either or both of two functions, the first being to provide a locating lug to assist accurate transporting of the strip in the apparatus, and the second being to assist operation of a device discharging fluid from the filled and sealed bulb by locating a piercing pin of the device and/or by producing a weakened area of the closure disc. The dimples may be formed on each closure disc or may be disposed to the side of the strip away from the zones out of which the closure discs are punched. In the latter position holes may be punched in the strip to assist with the transporting of the strip in the apparatus and no dimples may then be necessary except for the second function referred to above.

The incoming strip 40 is supported by a guide 43 attached to an arm 44 mounted on an extension 45 of the holder 2. A pawl 46 pivoted to the arm 44 is urged into contact with the strip 40 by a spring 47, and has a pointed end which engages in the dimples 42 so as to allow motion only in the feeding direction and in the correct pitch. A similarly pointed pawl 48 is pivoted on a link 49 at 50, and is urged toward the strip by a spring 51. At one end of the link 49 is mounted by a pivot pin 52 onto the upper part 10, and the other end is provided with a stud 53 and a spring 54 supporting the link 49 from an extension of the actuator 2. The stud 53 co-operates with the head of a bolt 56 held in an arm 55 attached to a fixed part of the machine framework. The arrangement is such that when the assembly 1 is raised together with the guide 43 and the strip 40, the stud 53 comes into contact with the bolt head 56, and the subsequent rotary movement of link 49 about the pivot 52 causes the pawl 48 to feed the strip in the direction 41. On return of the mechanism to the position shown, pawl 46 prevents backward movement of the strip.

In operation, the assembly is first raised by the holder 2 to allow a bulb 4 to be indexed laterally into place. Raising the assembly also allows the upper and lower parts 10 and 11 to separate by the amount permitted by the clearance C, and the resultant separation of the bush 31 from the die 25 allows strip 40 to be fed further into the filling station by the pawl 48, to present an unpunched portion of strip over the centre of the die 25.

With the bulb 4 in place, the assembly is first lowered so that the neck is engaged in fluid-tight manner by the annular electrode 14 and the resilient sealing ring 15 while the strip is retained in position by the pawl 46. As the assembly is further pressed downwardly by the holder 2, the body parts 10 and 11 are forced further together compressing the springs 13. The strip 40 is clamped between the die 25 and the bush 31, and the spring 32 is compressed. At this stage a fluid-tight chamber 18 has been formed bounded by the outer wall of the neck of the bulb 4, the axial bore in part 11 between the die 25 and the sealing ring 15, the inner walls of the die 25, and the lower face of the portion of strip 40 held firmly over the die opening by the bush 31. In the next stage of closure, the valve actuator 37 displaces the valve member 20 from the valve seat 19, and pressurized fluid is permitted to enter this chamber 18 and into the mouth of the bulb 4 via the inlet passage 17.

When the bulb has been charged with fluid, the electrode holder 35 is forced down to cause the combined punch and welding electrode 34 to blank out from the strip 40 a closure disc within the die 25. The punch 34 continues its downward movement to engage the closure disc against the end face of the bulb neck. With the closure disc held in this position a welding current is caused to flow through this disc from the punch 34 and through the bulb neck to the annular electrode 14. The closure disc is thus resistance welded to the bulb 4 closing its mouth and sealing the contents therein.

This completes the filling and sealing of the bulb, after which the plunger 35, and the assembly 1, may be raised ready for the removal of the filled bulb, the next bulb to be indexed into place.

In performing the invention, no pre-assembly of the closure elements onto the bulbs is necessary, and there is no undue restriction to fluid flow into the bulb.

While the method of the invention is particularly suitable for applying resistance welded closures to small metal containers filled with fluid, such as small bulbs used to contain pressurized carbon dioxide, the general principle of the invention may be used in other ways. For example, high frequency induction welding or ultrasonic welding could be used instead of resistance welding. Furthermore with a suitably shaped opening to the container and a correspondingly designed punch, the closure element could be fitted into or around the neck memerly by cold deformation. As a further variation, the filling station might be held stationary with the containers carried on an indexing table that is vertically movable to present each container to the filling station in turn.

I claim:

1. Apparatus for filling a container with fluid and then sealing it, comprising container engaging means adapted to engage in fluid-tight manner the container to be filled and sealed, a hollow die co-axial with the container and spaced from the container mouth when the container is engaged by the container engaging means, a hollow releasable clamping and sealing bush adapted to hold a portion of strip stock in fluid-tight manner against the end of the hollow die remote from the container, passage means for the flow of fluid into a closed chamber around the container mouth and into the container, the closed chamber being defined by the hollow die, the strip stock, and the container valve means allowing the admission of fluid to the closed chamber through the passage means, a punch operable within the hollow clamping and sealing bush and adapted to punch a closure element from the strip stock subsequent to filling of the container, and means for sealing the closure element onto the container.

2. Apparatus according to claim 1, wherein the means for sealing the closure element onto the container includes the punch.

3. Apparatus according to claim 2, wherein the means for sealing the closure element onto the container includes means for feeding resistance welding current to the punch and to the container.

References Cited

UNITED STATES PATENTS

| | | | |
|---|---|---|---|
| 940,123 | 11/1909 | Brenzinger | 53—88 |
| 1,790,787 | 2/1931 | Badger | 53—83 |
| 2,175,338 | 10/1939 | Booth | 53—296 X |
| 2,481,042 | 9/1949 | Tomasek et al. | 53—83 X |

TRAVIS S. McGEHEE, *Primary Examiner.*

U.S. Cl. X.R.

53—7, 88; 220—27